(12) United States Patent
Nielsen et al.

(10) Patent No.: US 8,375,404 B2
(45) Date of Patent: Feb. 12, 2013

(54) METHODS AND APPARATUS TO ENFORCE A POWER OFF STATE OF AN AUDIENCE MEASUREMENT DEVICE DURING SHIPPING

(75) Inventors: Christen V. Nielsen, Palm Harbor, FL (US); Larry D. Patterson, Dunedin, FL (US)

(73) Assignee: The Nielsen Company (US), LLC, Schaumburg, IL (US)

(*) Notice: Subject to any disclaimer, the term of this patent is extended or adjusted under 35 U.S.C. 154(b) by 381 days.

(21) Appl. No.: 12/346,416

(22) Filed: Dec. 30, 2008

(65) Prior Publication Data
US 2010/0169904 A1   Jul. 1, 2010

(51) Int. Cl.
| | |
|---|---|
| H04N 7/16 | (2006.01) |
| H04H 60/33 | (2008.01) |
| H04H 60/56 | (2008.01) |
| H04H 60/32 | (2008.01) |
| B65D 81/24 | (2006.01) |
| B65D 5/50 | (2006.01) |
| B65D 5/52 | (2006.01) |

(52) U.S. Cl. .............. 725/18; 725/9; 725/10; 725/12; 725/19; 206/736; 206/205; 206/206
(58) Field of Classification Search ............... 725/14
See application file for complete search history.

(56) References Cited

U.S. PATENT DOCUMENTS

| | | |
|---|---|---|
| 3,281,695 A | 10/1966 | Bass |
| 3,315,160 A | 4/1967 | Goodman |
| 3,483,327 A | 12/1969 | Schwartz |
| 3,651,471 A | 3/1972 | Haselwood et al. |
| 3,733,430 A | 5/1973 | Thompson et al. |
| 3,803,349 A | 4/1974 | Watanabe |
| 3,906,454 A | 9/1975 | Martin |
| 3,947,624 A | 3/1976 | Miyake |
| 4,027,332 A | 5/1977 | Wu et al. |
| 4,039,943 A | 8/1977 | Tapscott |
| 4,044,376 A | 8/1977 | Porter |
| 4,058,829 A | 11/1977 | Thompson |
| 4,245,245 A | 1/1981 | Matsumoto et al. |
| 4,388,644 A | 6/1983 | Ishman et al. |

(Continued)

FOREIGN PATENT DOCUMENTS

| | | |
|---|---|---|
| DE | 3401762 | 8/1985 |
| DE | 10247525 A1 | 4/2004 |

(Continued)

OTHER PUBLICATIONS

Thomas, William L., "Television Audience Research Technology, Today's Systems and Tomorrow's Challenges," Nielsen Media Research, Jun. 5, 1992 (4 pages).

(Continued)

Primary Examiner — Justin Shephard
(74) Attorney, Agent, or Firm — Hanley, Flight & Zimmerman, LLC

(57) ABSTRACT

Methods and apparatus to enforce a power off state of an audience measurement device during shipping of the device are disclosed herein. An example portable audience measurement device includes a housing, a media detector in the housing to collect media exposure data and a packaging sensor to detect a stimulus generated within the package. A packaging detector compares the detected stimulus to a criterion to determine whether the device is located within the package.

25 Claims, 9 Drawing Sheets

U.S. PATENT DOCUMENTS

| | | |
|---|---|---|
| 4,546,382 A | 10/1985 | McKenna et al. |
| 4,566,030 A | 1/1986 | Nickerson et al. |
| 4,574,304 A | 3/1986 | Watanabe et al. |
| 4,613,904 A | 9/1986 | Lurie |
| 4,622,583 A | 11/1986 | Watanabe et al. |
| 4,642,685 A | 2/1987 | Roberts et al. |
| 4,644,393 A | 2/1987 | Smith et al. |
| 4,647,964 A | 3/1987 | Weinblatt |
| 4,697,209 A | 9/1987 | Kiewit et al. |
| 4,723,302 A | 2/1988 | Fulmer et al. |
| 4,764,808 A | 8/1988 | Solar |
| 4,769,697 A | 9/1988 | Gilley et al. |
| 4,779,198 A | 10/1988 | Lurie |
| 4,800,437 A | 1/1989 | Hosoya |
| 4,807,031 A | 2/1989 | Broughton et al. |
| 4,876,736 A | 10/1989 | Kiewit |
| 4,885,632 A | 12/1989 | Mabey et al. |
| 4,907,079 A | 3/1990 | Turner et al. |
| 4,912,552 A | 3/1990 | Allison, III et al. |
| 4,931,865 A | 6/1990 | Scarampi |
| 4,943,963 A | 7/1990 | Waechter et al. |
| 4,965,825 A | 10/1990 | Harvey et al. |
| 4,972,503 A | 11/1990 | Zurlinden |
| 5,093,921 A | 3/1992 | Bevins, Jr. |
| 5,097,328 A | 3/1992 | Boyette |
| 5,107,203 A | 4/1992 | Timko |
| 5,136,644 A | 8/1992 | Audebert et al. |
| 5,165,069 A | 11/1992 | Vitt et al. |
| 5,226,177 A | 7/1993 | Nickerson |
| 5,235,414 A | 8/1993 | Cohen |
| 5,251,324 A | 10/1993 | McMullan, Jr. |
| 5,310,222 A | 5/1994 | Chatwin et al. |
| 5,319,453 A | 6/1994 | Copriviza et al. |
| 5,335,277 A | 8/1994 | Harvey et al. |
| 5,355,161 A | 10/1994 | Bird et al. |
| 5,398,055 A | 3/1995 | Nonomura et al. |
| 5,404,161 A | 4/1995 | Douglass et al. |
| 5,404,172 A | 4/1995 | Berman et al. |
| 5,408,258 A | 4/1995 | Kolessar |
| 5,425,100 A | 6/1995 | Thomas et al. |
| 5,479,408 A | 12/1995 | Will |
| 5,481,294 A | 1/1996 | Thomas et al. |
| 5,483,276 A | 1/1996 | Brooks et al. |
| 5,488,408 A | 1/1996 | Maduzia et al. |
| 5,505,901 A | 4/1996 | Harney et al. |
| 5,512,933 A | 4/1996 | Wheatley et al. |
| 5,550,928 A | 8/1996 | Lu et al. |
| 5,659,367 A | 8/1997 | Yuen |
| 5,760,760 A | 6/1998 | Helms |
| 5,767,922 A | 6/1998 | Zabih et al. |
| 5,771,307 A | 6/1998 | Lu et al. |
| 5,801,747 A | 9/1998 | Bedard |
| 5,872,588 A | 2/1999 | Aras et al. |
| 5,874,724 A | 2/1999 | Cato |
| 5,877,688 A | 3/1999 | Morinaka et al. |
| 5,889,548 A | 3/1999 | Chan |
| 5,896,554 A | 4/1999 | Itoh |
| 5,963,844 A | 10/1999 | Dail |
| 6,035,177 A | 3/2000 | Moses et al. |
| 6,049,286 A | 4/2000 | Forr |
| 6,124,877 A | 9/2000 | Schmidt |
| 6,137,539 A | 10/2000 | Lownes et al. |
| 6,148,081 A | 11/2000 | Szymanski et al. |
| 6,177,931 B1 | 1/2001 | Alexander et al. |
| 6,184,918 B1 | 2/2001 | Goldschmidt Iki et al. |
| 6,191,690 B1 | 2/2001 | Mukogawa |
| 6,243,007 B1 | 6/2001 | McLaughlin et al. |
| 6,286,140 B1 | 9/2001 | Ivanyi |
| 6,297,859 B1 | 10/2001 | George |
| 6,298,218 B1 | 10/2001 | Lowe et al. |
| 6,311,214 B1 | 10/2001 | Rhoads |
| 6,311,837 B1 | 11/2001 | Blaustein et al. |
| 6,319,087 B1 | 11/2001 | Ferrigno |
| 6,388,662 B2 | 5/2002 | Narui et al. |
| 6,400,996 B1 | 6/2002 | Hoffberg et al. |
| 6,457,010 B1 | 9/2002 | Eldering et al. |
| 6,463,413 B1 | 10/2002 | Applebaum et al. |
| 6,467,089 B1 | 10/2002 | Aust et al. |
| 6,477,508 B1 | 11/2002 | Lazar et al. |
| 6,487,719 B1 | 11/2002 | Itoh et al. |
| 6,513,046 B1 | 1/2003 | Abbott, III et al. |
| 6,519,769 B1 | 2/2003 | Hopple et al. |
| 6,523,175 B1 | 2/2003 | Chan |
| 6,529,212 B2 | 3/2003 | Miller et al. |
| 6,542,878 B1 | 4/2003 | Heckerman et al. |
| 6,567,978 B1 | 5/2003 | Jarrell |
| 6,570,559 B1 | 5/2003 | Oshima |
| 6,574,592 B1 | 6/2003 | Nankawa et al. |
| 6,646,864 B2 | 11/2003 | Richardson |
| 6,647,212 B1 | 11/2003 | Toriumi et al. |
| 6,647,548 B1 | 11/2003 | Lu et al. |
| 6,675,383 B1 | 1/2004 | Wheeler et al. |
| 6,681,396 B1 | 1/2004 | Bates et al. |
| 6,791,472 B1 | 9/2004 | Hoffberg |
| 6,842,877 B2 | 1/2005 | Robarts et al. |
| 6,868,292 B2 | 3/2005 | Ficco et al. |
| 6,891,473 B2 | 5/2005 | Maloney |
| 6,892,880 B2 | 5/2005 | Nieves |
| 6,934,508 B2 | 8/2005 | Ceresoli et al. |
| 6,946,803 B2 | 9/2005 | Moore |
| 7,051,352 B1 | 5/2006 | Schaffer |
| 7,100,181 B2 | 8/2006 | Srinivasan et al. |
| 7,109,864 B2 | 9/2006 | Maloney |
| 7,111,317 B1 | 9/2006 | McIntyre et al. |
| 7,150,030 B1 | 12/2006 | Eldering et al. |
| 7,258,229 B2 | 8/2007 | Chan |
| 2002/0012353 A1 | 1/2002 | Gerszberg et al. |
| 2002/0015112 A1 | 2/2002 | Nagakubo et al. |
| 2002/0026635 A1 | 2/2002 | Wheeler et al. |
| 2002/0056087 A1 | 5/2002 | Berezowski et al. |
| 2002/0057893 A1 | 5/2002 | Wood et al. |
| 2002/0059577 A1 | 5/2002 | Lu et al. |
| 2002/0072952 A1 | 6/2002 | Hamzy et al. |
| 2002/0077880 A1 | 6/2002 | Gordon et al. |
| 2002/0080286 A1 | 6/2002 | Dagtas et al. |
| 2002/0083435 A1 | 6/2002 | Blasko et al. |
| 2002/0141730 A1 | 10/2002 | Haken |
| 2002/0145531 A1 | 10/2002 | Delaney |
| 2002/0174425 A1 | 11/2002 | Markel et al. |
| 2002/0198762 A1 | 12/2002 | Donato |
| 2003/0046685 A1 | 3/2003 | Srinivasan et al. |
| 2003/0054757 A1 | 3/2003 | Kolessar et al. |
| 2003/0056215 A1 | 3/2003 | Kanungo |
| 2003/0067459 A1 | 4/2003 | Lim |
| 2003/0070183 A1 | 4/2003 | Pierre et al. |
| 2003/0093790 A1 | 5/2003 | Logan et al. |
| 2003/0101449 A1 | 5/2003 | Bentolila et al. |
| 2003/0103088 A1 | 6/2003 | Dresti et al. |
| 2003/0110485 A1 | 6/2003 | Lu et al. |
| 2003/0115591 A1 | 6/2003 | Weissmueller et al. |
| 2003/0131350 A1 | 7/2003 | Peiffer et al. |
| 2003/0216120 A1 | 11/2003 | Ceresoli et al. |
| 2004/0003394 A1 | 1/2004 | Ramaswamy |
| 2004/0055020 A1 | 3/2004 | Delpuch |
| 2004/0058675 A1 | 3/2004 | Lu et al. |
| 2004/0073918 A1 | 4/2004 | Ferman et al. |
| 2004/0088212 A1 | 5/2004 | Hill |
| 2004/0088721 A1 | 5/2004 | Wheeler et al. |
| 2004/0100437 A1 | 5/2004 | Hunter et al. |
| 2004/0210922 A1 | 10/2004 | Peiffer et al. |
| 2004/0233126 A1 | 11/2004 | Moore |
| 2005/0011423 A1* | 1/2005 | Mercier ........................ 109/45 |
| 2005/0054285 A1 | 3/2005 | Mears et al. |
| 2005/0057550 A1 | 3/2005 | George |
| 2005/0071639 A1 | 3/2005 | Rodgers et al. |
| 2005/0125820 A1 | 6/2005 | Nelson et al. |
| 2005/0138231 A1 | 6/2005 | Yamaguchi et al. |
| 2005/0161313 A1 | 7/2005 | Sorrentino et al. |
| 2005/0177624 A1 | 8/2005 | Oswald et al. |
| 2005/0177745 A1 | 8/2005 | Oswald et al. |
| 2005/0177853 A1 | 8/2005 | Williams et al. |
| 2005/0221774 A1 | 10/2005 | Ceresoli et al. |
| 2005/0240498 A1 | 10/2005 | Thaler |
| 2005/0257242 A1 | 11/2005 | Montgomery et al. |
| 2005/0285835 A1 | 12/2005 | Jessop |
| 2005/0286860 A1 | 12/2005 | Conklin |
| 2006/0059532 A1 | 3/2006 | Dugan et al. |

| | | | |
|---|---|---|---|
| 2006/0069557 | A1 | 3/2006 | Barker et al. |
| 2006/0075421 | A1 | 4/2006 | Roberts et al. |
| 2006/0093998 | A1 | 5/2006 | Vertegaal |
| 2006/0143645 | A1* | 6/2006 | Vock et al. ............... 725/9 |
| 2006/0149964 | A1 | 7/2006 | Chhabra |
| 2006/0195857 | A1 | 8/2006 | Wheeler et al. |
| 2006/0212895 | A1 | 9/2006 | Johnson |
| 2006/0232575 | A1 | 10/2006 | Nielsen |
| 2006/0250217 | A1* | 11/2006 | Hamling et al. ............. 340/5.73 |
| 2007/0024615 | A1 | 2/2007 | Keller et al. |
| 2007/0063850 | A1 | 3/2007 | Devaul et al. |
| 2007/0103312 | A1 | 5/2007 | Watanabe |
| 2007/0124615 | A1 | 5/2007 | Orr |
| 2007/0125162 | A1 | 6/2007 | Ghazi et al. |
| 2007/0152829 | A1 | 7/2007 | Lindsay et al. |
| 2007/0186228 | A1 | 8/2007 | Ramaswamy et al. |
| 2007/0192782 | A1 | 8/2007 | Ramaswamy |
| 2008/0028427 | A1 | 1/2008 | Nesvadba et al. |
| 2008/0047350 | A1 | 2/2008 | Atlas et al. |
| 2008/0060952 | A1* | 3/2008 | Negron ............. 206/205 |
| 2008/0148307 | A1 | 6/2008 | Nielsen et al. |
| 2008/0276265 | A1 | 11/2008 | Topchy et al. |
| 2008/0282817 | A1 | 11/2008 | Breed |
| 2009/0055854 | A1* | 2/2009 | Wright et al. ............ 725/14 |

FOREIGN PATENT DOCUMENTS

| | | |
|---|---|---|
| EP | 0593202 | 4/1994 |
| EP | 0946012 | 9/1999 |
| EP | 1067496 | 1/2001 |
| EP | 1318679 | 6/2003 |
| GB | 1574964 | 9/1980 |
| JP | 8331482 | 12/1996 |
| JP | 2000307520 | 11/2000 |
| WO | 9115062 | 10/1991 |
| WO | 9512278 | 5/1995 |
| WO | 9526106 | 9/1995 |
| WO | 9810539 | 3/1998 |
| WO | 9933206 | 7/1999 |
| WO | 9959275 | 11/1999 |
| WO | 0038360 | 6/2000 |
| WO | 0072484 | 11/2000 |
| WO | 0111506 | 2/2001 |
| WO | 0161892 | 8/2001 |
| WO | 0219581 | 3/2002 |
| WO | 02052759 | 7/2002 |
| WO | 03049339 | 6/2003 |
| WO | 03052552 | 6/2003 |
| WO | 03060630 | 7/2003 |
| WO | 2005032145 | 4/2005 |
| WO | 2005038625 | 4/2005 |
| WO | 2005041166 | 5/2005 |
| WO | 2005055601 | 6/2005 |
| WO | 2005065159 | 7/2005 |
| WO | 2005079457 | 9/2005 |
| WO | 2006012629 | 2/2006 |
| WO | 2007120518 | 10/2007 |
| WO | 2007136742 | 11/2007 |

OTHER PUBLICATIONS

Vincent et al., "A Tentative Typology of Audio Source Separation Tasks," 4th International Symposium on Independent Component Analysis and Blind Signal Separation (ICA 2003), held in Nara, Japan, Apr. 2003 (6 pages).

Smith, Leslie S., "Using IIDs to Estimate Sound Source Direction," Proceedings of the Seventh International Conference on Simulation of Adaptive Behavior on from Animals to Animats, pp. 60-61, 2002 (2 pages).

Dai et al., "Transferring Naive Bayes Classifiers for Text Classification," Proceedings of the Twenty-Second AAAI Conference on Artificial Intelligence, held in Vancouver, British Columbia on Jul. 22-26, 2007 (6 pages).

Elkan, Charles, "Naive Bayesian Learning," Adapted from Technical Report No. CS97-557, Department of Computer Science and Engineering, University of California, San Diego, U.S.A., Sep. 1997 (4 pages).

Zhang, Harry, "The Optimality of Naive Bayes," Proceedings of the Seventeenth International FLAIRS Conference, 2004 (6 pages).

Domingos et al., "On the Optimality of the Simple Bayesian Classifier under Zero-One Loss," Machine Learning, vol. 29, No. 2, pp. 103-130, Nov. 1, 1997 (28 pages).

Patron-Perez et al., "A Probabilistic Framework for Recognizing Similar Actions using Spatio-Temporal Features," BMVC07, 2007 [Retrieved from the Internet on Feb. 29, 2008] (10 pages).

Mitchell, Tom M., "Chapter 1; Generative and Discriminative Classifiers: Naive Bayes and Logistic Regression," Machine Learning, Sep. 21, 2006 (17 pages).

Lang, Marcus, "Implementation on Naive Bayesian Classifiers in Java," http://www.iit.edu/~ipro356f03/ipro/documents/naive-bayes.edu [Retrieved from the Internet on Feb. 29, 2008] (4 pages).

Liang et al., "Learning Naive Bayes Tree for Conditional Probability Estimation," Proceedings of the Canadian Al-2006 Conference, held in Quebec, Canada, pp. 456-466, on Jun. 7-9, 2006 (13 pages).

Mozina et al., "Nomograms for Visualization of Naive Bayesian Classifier," Proceedings of the Eight European Conference on Principles and Practice of Knowledge Discovery in Databases, held in Pisa, Italy, pp. 337-348, 2004 [Retrieved from the Internet on Feb. 29, 2008] (12 pages).

"Lecture 3; Naive Bayes Classification," http://www.cs.utoronto.ca/~strider/CSCD11_f8/NaiveBayes_Zemel.pdf [Retrieved from the Internet on Feb. 29, 2008] (9 pages).

Klein, Dan, PowerPoint Presentation of "Lecture 23: Naïve Bayes," CS 188: Artificial Intelligence held on Nov. 15, 2007 (6 pages).

"Learning Bayesian Networks: Naïve and non-Naïve Bayes" Oregon State University, Oregon [Retrieved from the Internet on Feb. 29, 2008]. Retrieved from the Internet: http://web.engr.oregonstate.edu/~tgd/classess/534/slides/part6.pdf (19 pages).

"The Naïve Bayes Classifier," CS534-Machine Learning, Oregon State University, Oregon [Retrieved from the Internet on Feb. 29, 2008]. Retrieved from the Internet: http://web.engr.oregonstate.edu/~afern/classes/cs534/notes/Naivebayes-10.pdf (19 pages).

"Bayesian Networks," Machine Learning A, 708.064 07 lsst KU Oregon State University, Oregon [Retrieved from the Internet on Feb. 29, 2008]. Retrieved from the Internet: http://www.igi.tugraz.at.lehre/MLA/WS07/slides3.pdf (17 pages).

"The Peltarion Blog," Jul. 10, 2006 [Retrieved from the Internet on Mar. 11, 2009] Retrieved from the Internet: http//blog.peltarion.com/2006/07/10/classifier-showdown (14 pages).

"Logical Connective: Philosophy 103: Introduction to Logic Conjunction, Negation, and Disjunction,"[Retrieved from the Internet on 200-03-11] Retrieved from the Internet: http://philosophy.lander.edu/logic/conjunct.html (5 pages).

"Naive Bayes Classifier," Wikipedia entry as of Mar. 11, 2009 [Retrieved from the Internet on Mar. 11, 2009] (7 pages).

"Naïve Bayes Classifier," Wikipedia entry as of Jan. 11, 2008 [Retrieved from the Internet from Wikipedia history pages on Mar. 11, 2009] (7 pages).

Zimmerman, H., "Fuzzy set applications in pattern recognition and data-analysis," 11th IAPR International conference on Pattern Recognition, Aug. 29, 1992 (81 pages).

Patent Cooperation Treaty, "Written Opinion of the International Searching Authority," issued by the International Searching Authority in connection with PCT application No. PCT/US2003/030355, mailed Mar. 21, 2008 (5 pages).

Patent Cooperation Treaty, "International Search Report," issued by the International Searching Authority in connection with PCT application No. PCT/US2003/030355, mailed May 5, 2004 (6 pages).

Patent Cooperation Treaty, "International Preliminary Examination Report," issued by the International Preliminary Examining Authority in connection with PCT application No. PCT/US2003/030370, mailed Mar. 7, 2005 (4 pages).

Patent Cooperation Treaty, "International Search Report," issued by the International Searching Authority in connection with PCT application No. PCT/US2003/030370, mailed Mar. 11, 2004 (7 pages).

Patent Cooperation Treaty, "Written Opinion of the International Searching Authority," issued by the International Searching Authority in connection with PCT application No. PCT/US2003/030370, mailed Nov. 15, 2004 (5 pages).

European Patent Office, "Extended European Search Report," issued in connection with European Patent Application No. EP05798239.9, on Sep. 9, 2008 (4 pages).

Patent Cooperation Treaty, "International Preliminary Report on Patentability," issued by the International Bureau in connection with PCT application No. PCT/US2005/028106, mailed Apr. 5, 2007 (5 pages).

Patent Cooperation Treaty, "International Search Report," issued by the International Searching Authority in connecteion with PCT application No. PCT/US2005/028106, mailed Mar. 12, 2007 (2 pages).

Patent Cooperation Treaty, "Written Opinion of the International Searching Authority," issued by the International Searching Authority in connection with PCT application No. PCT/US2005/028106, mailed Mar. 12, 2007 (4 pages).

Patent Cooperation Treaty, "International Search Report," issued by the International Searching Authority in connection with PCT application No. PCT/US2006/031960, mailed Feb. 21, 2007 (2 pages).

Patent Cooperation Treaty, "Written Opinion of the International Searching Authority," issued by the International Searching Authority in connection with PCT application No. PCT/US2006/031960, mailed Feb. 21, 2007 (3 pages).

Patent Cooperation Treaty, "International Preliminary Report on Patentability," issued by the International Bureau in connection with PCT application No. PCT/US2006/031960, issued Feb. 20, 2008 (4 pages).

Patent Cooperation Treaty, "International Preliminary Report on Patentability," issued by the International Bureau in connection with PCT application No. PCT/US2007/011894, on Nov. 18, 2008 (8 pages).

Patent Cooperation Treaty, "International Search Report," issued by the International Searching Authority in connection with PCT application No. PCT/US2007/011894, mailed Mar. 19, 2008 (4 pages).

Patent Cooperation Treaty, "Written Opinion," issued by the International Searching Authority in connection with PCT application No. PCT/US2007/011894, mailed Mar. 19, 2008 (7 pages).

Non-Final Office Action issued by the United States Patent and Trademark Office on Feb. 5, 2009, in connection with U.S. Appl. No. 11/576,328 (20 pages).

United States Patent and Trademark Office, "Non-Final Office Action," issued in connection with U.S. Appl. No. 11/576,328, on Aug. 7, 2009 (11 pages).

United States Patent and Trademark Office, "Notice of Allowance," issued in connection with U.S. Appl. No. 11/576,328, on Apr. 7, 2010 (8 pages).

United States Patent and Trademark Office, "Non-Final Office Action," issued in connection with U.S. Appl. No. 11/388,262, on Mar. 5, 2009 (10 pages).

United States Patent and Trademark Office, "Final Office Action," issued in connection with U.S. Appl. No. 11/388,262, on Sep. 2, 2009 (13 pages).

United States Patent and Trademark Office, "Advisory Action," issued in connection with U.S. Appl. No. 11/388,262, on Jan. 7, 2010 (3 pages).

Non-Final Office Action issued by the United States Patent and Trademark Office on Dec. 27, 2007, in connection with U.S. Appl. No. 11/388,555 (12 pages).

Final Office Action issued by the United States Patent and Trademark Office on Oct. 6, 2008, in connection with U.S. Appl. No. 11/388,555 (18 pages).

Advisory Action issued by the United States Patent and Trademark Office on Jan. 13, 2009, in connection with U.S. Appl. No. 11/388,555 (4 pages).

United States Patent and Trademark Office, "Non-Final Office Action," issued in connection with U.S. Appl. No. 11/388,555, on Mar. 31, 2009 (10 pages).

United States Patent and Trademark Office, "Final Office Action," issued in connection with U.S. Appl. No. 11/388,555, on Dec. 8, 2009 (12 pages).

United States Patent and Trademark Office, "Advisory Action," issued in connection with U.S. Appl. No. 11/388,555, on Mar. 22, 2010 (3 pages).

United States Patent and Trademark Office, "Non-Final Office Action," issued in connection with U.S. Appl. No. 11/672,706, on Jul. 23, 2009 (8 pages).

United States Patent and Trademark Office, "Notice of Allowance," issued in connection with U.S. Appl. No. 11/672,706, on Dec. 31, 2009 (6 pages).

Australian Patent and Trademark Office, Examiner's Report on AU patent application 2007254220, dated Jun. 17, 2010, 2 pages.

Chinese Patent and Trademark Office, Office Action issued for CN application 2007800228961 (with English translation), issued on Aug. 11, 2010, 6 pages.

United States Patent and Trademark Office, "Non-Final Office action," issued in connection with U.S. Appl. No. 11/388,262 on Apr. 28, 2010 (12 pages).

United States Patent and Trademark Office, "Non-Final Office action," issued in connection with U.S. Appl. No. 11/388,262 on Oct. 12, 2010 (12 pages).

United States Patent and Trademark Office, "Notice of Allowance," issued in connection with U.S. Appl. No. 11/388,555 on May 20, 2010 (4 pages).

United States Patent and Trademark Office, "Non-Final Office action," issued in connection with U.S. Appl. No. 12/346,423 on Jan. 21, 2011 (13 pages).

United States Patent and Trademark Office, "Non-Final Office action," issued in connection with U.S. Appl. No. 12/346,430 on Mar. 14, 2011 (13 pages).

United States Patent and Trademark Office, Non-Final Office Action, in connection with U.S. Appl. No. 12/088,802, issued on Sep. 12, 2011, (16 pages).

United States Patent and Trademark Office, Non-Final Office Action, in connection with U.S. Appl. No. 12/346,430, issued on Mar. 14, 2011, (23 pages).

United States Patent and Trademark Office, Non-Final Office Action, in connection with U.S. Appl. No. 12/346,423, issued on Jul. 5, 2011, (15 pages).

United States Patent and Trademark Office, Notice of Allowance and Fee(s) Due, issued in connection with U.S. Appl. No. 12/346,430, mailed on Nov. 23, 2011, 8 pages.

United States Patent and Trademark Office, Final Office Action, in connection with U.S. Appl. No. 12/346,423, issued on Nov. 2, 2011, 18 pages.

Australian Government, IP Australia, Notice of Acceptance, issued in connection with application serial No. 2007254220, issued Mar. 14, 2012, 3 pages.

Chinese Patent Office, Office Action, issued in connection with CN application serial No. 200780022896.1, issued on Jan. 29, 2012, English Translation, 1 page.

Canadian Intellectual Property Office, Office Action, issued in connection with CA application serial No. 2,652,655, dated Apr. 21, 2011, 3 pages.

Mexico Intellectual Property Office, Office Action, issued in connection with MX application serial No. MX/a/2008/014700, on Aug. 26, 2011, 2 pages.

European Patent Office, Extended European Search Report, for application serial No. 07777143.4, issued on Apr. 11, 2012, (7 pages).

Office action issued by the United States Patent and Trademark Office on Aug. 10, 2012, in connection with U.S. Appl. No. 12/346,423 (20 pages).

* cited by examiner

METHODS AND APPARATUS TO ENFORCE A POWER OFF STATE OF AN AUDIENCE MEASUREMENT DEVICE DURING SHIPPING

CROSS REFERENCE TO RELATED APPLICATIONS

This application is related to U.S. patent application Ser. No. 12/346,423 entitled "Methods and Apparatus to Enforce a Power Off State of an Audience Measurement Device During Shipping," and U.S. patent application Ser. No. 12/346,430 entitled "Methods and Apparatus to Enforce a Power Off State of an Audience Measurement Device During Shipping," the contents of which are incorporated herein by reference in their entirety.

FIELD OF THE DISCLOSURE

The present disclosure relates generally to audience measurement and, more particularly, to methods and apparatus to enforce a power off state of an audience measurement device during shipping of the device.

BACKGROUND

Media-centric companies are often interested in tracking the number of times that audience members are exposed to various media compositions (e.g., television programs, motion pictures, internet videos, radio programs, etc.). In some instance, to track such exposures, companies generate audio and/or video signatures of media compositions (e.g., a representation of some, preferably unique, portion of the media composition or the signal used to transport the media composition) that can be used to determine when those media compositions are presented to audience members. The media compositions may be identified by comparing the signature to a database of reference signatures. Additionally or alternatively, companies transmit identification codes (e.g., watermarks) with media compositions to monitor presentations of those media compositions to audience members by comparing identification codes retrieved from media compositions presented to audience members with reference identification codes stored in a reference database. Like the reference signature, the reference codes are stored in association with information descriptive of the corresponding media compositions to enable identification of the media compositions.

Media ratings and metering information are typically generated by collecting media exposure information from a group of statistically selected households. Each of the statistically selected households typically has a data logging and processing unit such as, for example, a stationary or portable media measurement device, commonly referred to as a "metering device" or "meter." The meter typically includes sensors to gather data from the monitored media presentation devices (e.g., audio-video (AV) devices) at the selected site and deliver the gathered data to a centralized location for processing.

DETAILED DESCRIPTION

Figure 1:
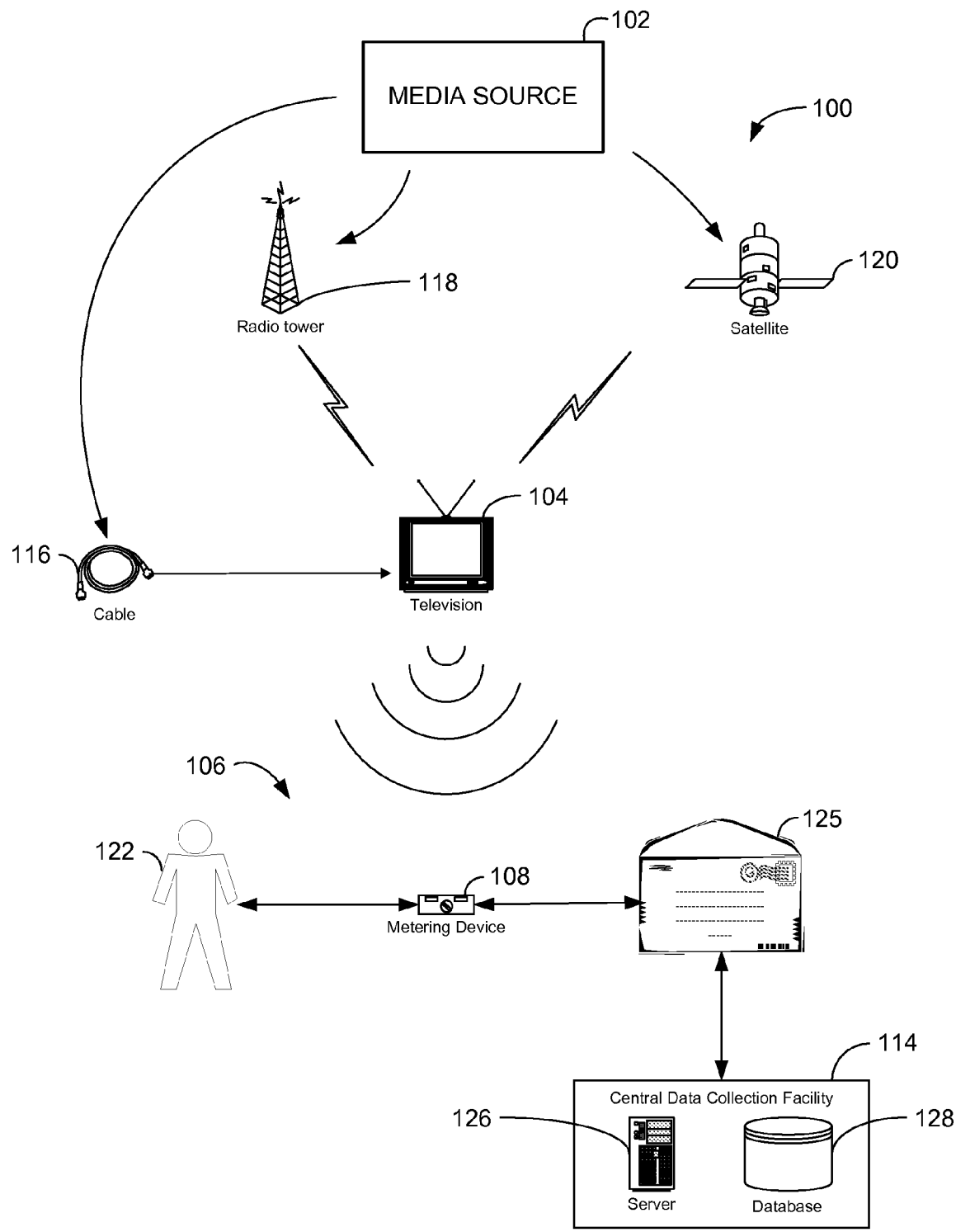
FIG. 1 is a block diagram of an example media exposure measurement system.

Although the following discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

The example methods, apparatus, systems, and articles of manufacture described herein can be used to power on and/or power off a metering device such as, for example, a stationary or a portable media measurement device. To collect media exposure information, the metering device is configured to generate, detect, decode, and/or, more generally, collect media identifying data (e.g., audio codes, video codes, audio signatures, video signatures, etc.) associated with media presentations to which the portable meter is exposed.

The media exposure data is collected by the meter and forwarded to a central facility where it is used to statistically determine the size and/or demographics of audiences exposed to media presentations. The process of enlisting and retaining the panel participants ("panelists") can be a difficult and costly aspect of the audience measurement process. For example, panelists must be carefully selected and screened for particular demographic characteristics so that the panel is representative of the population(s) of interest. In addition, installing traditional audience measurement devices in panelist's residences has been expensive and time consuming. Thus, it is advantageous to create a meter that is less costly and can be installed easily by a panelist to make participation easier.

In the example meter described herein, a mailable metering device collects audio codes and/or signatures and stores them into memory for the limited time frame the meter is in the panelist's home. The meter is assembled and activated at a first location, and is mailed to the panelist who installs the meter by, for example, placing it near a media presentation device (e.g., a television) to be monitored. The meter collects data regarding the media presentations exposed to the meter for a time frame (e.g., one month). Once the time frame expires, the meter is placed into return packaging by the panelist and mailed to a collection center (e.g., a central facility) for data extraction. The example metering device is active (e.g., is at least partially powered "on") at the time of configuration (pre-shipping) and is in a stand-by mode during shipping. An internal clock initiates a "wake-up" at a specific time to begin metering (e.g., to collect data regarding media exposure). At the end of the metering period (e.g., when the memory is full, the time period expires, etc.), the device generates a "mail me back" reminder. The meter goes back into the stand-by mode when packaged for mailing to the central facility and remains in that mode until the data is extracted at the central facility.

Some mail carriers, however, do not allow items to be shipped with batteries installed therein. This prohibition against battery usage during shipment eliminates the ability to ship a metering device that is at least partially powered on. Other carriers allow a device to be shipped with batteries installed as long as the batteries are installed inside the device, and the device is powered "off." These carriers define "off" as all circuits being inactive except for real-time clocks and memory keep-alive circuits. To address this problem, the meters disclosed herein automatically power on or power off by detecting a stimulus and determining when the meter is located in or out of a shipping container.

The example methods, apparatus, systems, and articles of manufacture described herein determine whether the metering device is located within a mailer, or other shipping container, by determining whether the metering device is located within sufficient proximity to a stimulus or beacon located within a package to be within the package. In particular, the example mailer includes a device capable of generating a stimulus, such as, for example, a speaker, a magnet, an IR transmitter, an RF transmitter, a physical switch, etc. The generated stimulus may be any physical and/or non-physical (i.e., non-contacting) factor external to the metering device that may be sensed by the metering device, such as, for example, a sound, a magnetic field, an IR signal, an RF signal, a physical contact, etc. The metering device determines whether or not it is located within a mailer based on whether or not it detects a stimulus or beacon located within the mailer. For example, if the stimulus is a physical object, such as a projection to engage a switch, etc., then physical contact between the metering device and the physical object causes the metering device to determine that the metering device is located within the mailer. In other examples, if the stimulus is a detectable signal or field, such as, for instance, a magnetic field generated by a magnet located with mailer, then detection of the field or signal causes the metering device to determine that the metering device is located within the mailer. If, however, the metering device fails to detect the expected stimulus, than the meter is determined not to be within a mailer. The determined meter location can be used to power off the device when the device is determined to be within the mailer, thereby ensuring compliance with the regulations of shipping and/or courier services.

In the example of FIG. 1, an example media presentation system 100 including a media source 102 and a media presentation device 104 is metered using an example media measurement system 106. The example media measurement system 106 includes a "mailable" metering device 108 and a central facility 114. The metering device 108 is "mailable" in the sense that its size (e.g., form) enables it to be shipped via a commercial carrier such as, for example, the United States Postal Service ("USPS"), United Parcel Service ("UPS"), FedEx, DHL, and/or other suitable postal service. The media presentation device 104 is configured to receive media from the media source 102 via any of a plurality of transmission systems including, for example, a cable service provider 116, a radio frequency (RF) service provider 118, a satellite service provider 120, an Internet service provider (ISP) (not shown), or via any other analog and/or digital broadcast network, multicast network, and/or unicast network. Further, although the example media presentation device 104 of FIG. 1 is shown as a television, the example media measurement system 106 is capable of collecting information from any type of media presentation device including, for example, a personal computer, a laptop computer, a radio, a cinematic projector, an MP3 player, or any other audio and/or video presentation device or system.

The metering device 108 of the illustrated example is disposed on or near the media presentation device 104 and may be adapted to perform one or more of a plurality of metering methods (e.g., channel detection, collecting signatures and/or codes, etc.) to collect data concerning the media exposure of the metering device 108, and thus, the media exposure of one or more panelist(s) 122. Depending on the type(s) of metering that the metering device 108 is adapted to perform, the metering device 108 may be physically coupled to the presentation device 104 or may instead be configured to capture signals emitted externally by the presentation device 104 such that direct physical coupling to the presentation device 104 is not required. For instance, in this example, the metering device 108 is not physically or electronically coupled to the monitored presentation device 104. Instead, the metering device 108 is provided with at least one audio sensor, such as, for example, a microphone, to capture audio data regarding in-home media exposure for the panelist 122 and/or a group of household members. Similarly, the example metering device 108 is configured to perform one or more of a plurality of metering methods (e.g., collecting signatures and/or codes) on the collected audio to enable identification of the media to which the panelist(s) 122 carrying and/or proximate to the device 108 are exposed.

In the example of FIG. 1, the metering device 108 is adapted to be mailed to and/or from the remotely located central data collection facility 114 within a shipping container 125 such as, for example, an envelope, package, or other mailer, via a package delivery service 124. The example central data collection facility 114 includes a server 126 and a database 128 to process and/or store data received from the metering device 108 and/or other metering device(s) (not shown) used to measure other panelists. In another example, multiple servers and/or databases may be employed as desired. The package delivery service may be any suitable package delivery service including, for example, the United States Postal Service ("USPS"), United Parcel Service ("UPS"), FedEx, DHL, etc. It will be appreciated that the shipping address of the facility that receives the meter 108 may be separately located from the central data collection facility 114, and that the central data collection facility 114 may be communicatively coupled to the meter collection facility via any suitable data transfer network and/or method.

Figure 2:
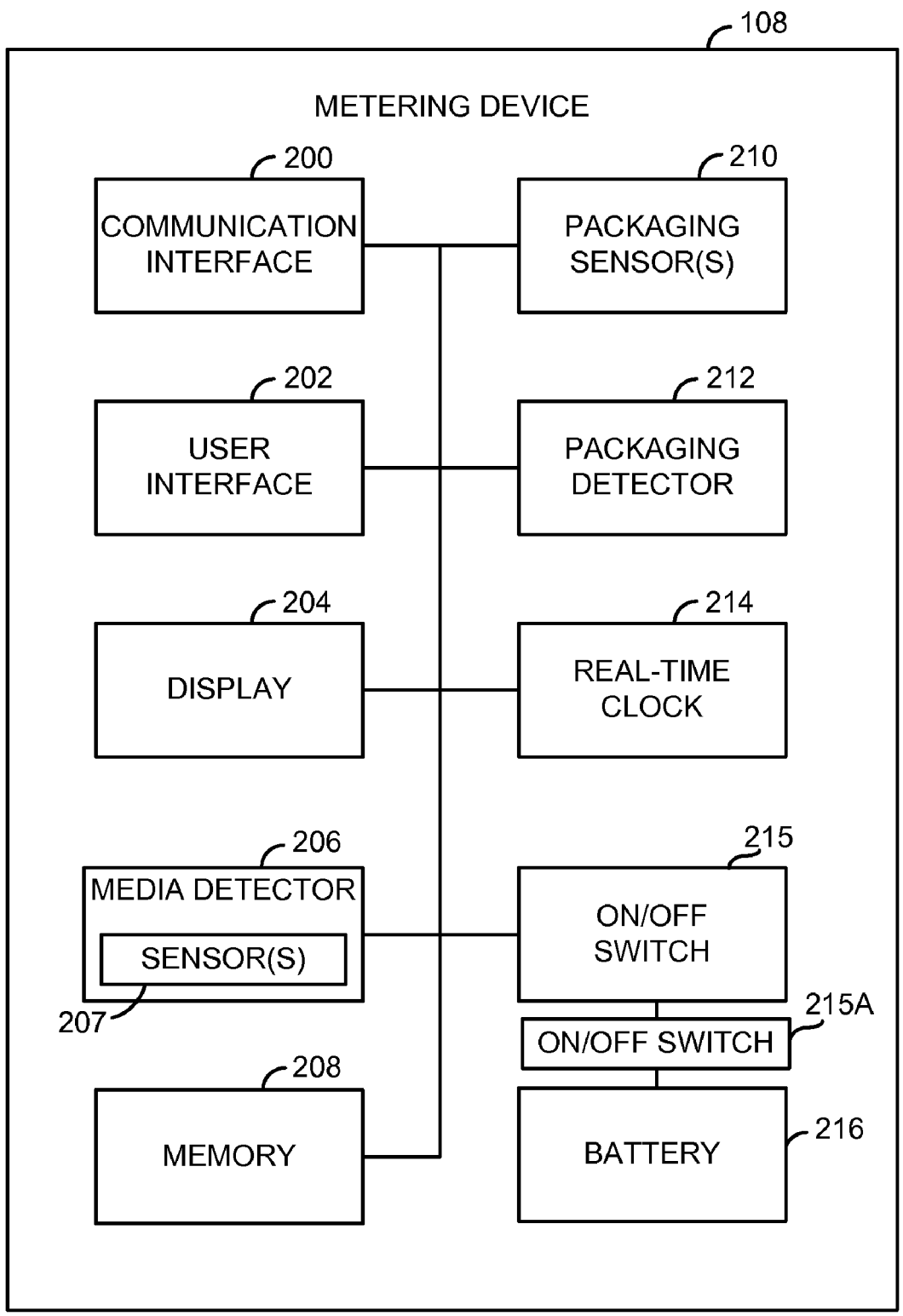
FIG. 2 is a block diagram of the example metering device of FIG. 1.

FIG. 2 is a block diagram of an example apparatus that may be used to implement the example metering device 108 of FIG. 1. In the illustrated example of FIG. 2, the example metering device 108 includes a communication interface 200, a user interface 202, a display 204, a media detector 206, a memory 208, a packaging sensor(s) 210, a packaging detector 212, a real-time clock 214, and a power supply, such as for example a battery 216. While an example manner of implementing the metering device 108 of FIG. 1 has been illustrated in FIG. 2, one or more of the elements, processes and/or devices illustrated in FIG. 2 may be combined, divided, rearranged, omitted, eliminated and/or implemented in any other way. Further, each of the example communication interface 200, the user interface 202, the example display 204, the example media detector 206, the example memory 208, the example packaging sensor(s) 210, the example packaging detector 212, the example real-time clock 214, and/or, more generally, the example metering device 108 may be implemented by hardware, software, firmware and/or any combination of hardware, software and/or firmware. Thus, for example, any of the example communication interface 200, the user interface 202, the example display 204, the example media detector 206, the example memory 208, the example packaging sensor(s) 210, the example packaging detector 212, the example real-time clock 214, and/or, more generally, the metering devices 108 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example communication interface 200, the user interface 202, the example display 204, the example media detector 206, the example memory 208, the example packaging sensor(s) 210, the example packaging detector 212, the example real-time clock 214, and/or, more generally, the example metering device 108 are hereby expressly defined to include a tangible, computer-readable medium such as a memory, DVD, CD, etc. storing the software and/or firmware. Further still, the example metering device 108 may include one or more elements, processes and/or devices in addition to, or instead of, those illustrated in FIG. 2, and/or may include more than one of any or all of the illustrated elements, processes and devices.

The communication interface 200 of the illustrated example enables the metering device 108 to convey and/or receive data to and/or from the other components of the media exposure measurement system 106. For example, the example communication interface 200 enables communication between the metering device 108 and the meter collection facility and/or central facility 114 after the metering device 108 is delivered to the meter collection facility and/or central facility 114. The communication interface 200 of FIG. 2 is implemented by, for example, an Ethernet card, a digital subscriber line, a coaxial cable, and/or any other wired and/or wireless connection.

The user interface 202 of the illustrated example may be used by the panelist 122 or other user to enter data, such as, for example, identity information associated with the panelist 122 or other subject and/or demographic data such as age, race, sex, household income, etc. and/or commands into the metering device 108. Entered data and/or commands are stored, for example, in the memory 208 (e.g., memory 524 and/or memory 525 of the example processor system 510 of FIG. 5) and may be subsequently transferred to the central facility 114. The example user interface 202 is implemented by, for example, button(s), a keyboard, a mouse, a track pad, a track ball, a voice recognition system, and/or any other suitable interface.

The example display 204 of FIG. 2 is implemented using, for example, a light emitting diode (LED) display, a liquid crystal display (LCD), and/or any other suitable display configured to present visual information. In some examples, the display 204 conveys information associated with status information, such as, for example, whether the metering device is powered on or powered off, and/or mailing reminders. The example display 204, however, may be configured to display any desired visual information. Although the display 204 and the user interface 202 are shown as separate components in the example of FIG. 2, the display 204 and the user interface 202 may instead be integrated into a single component such as, for example, a touch-sensitive screen configured to enable interaction between the panelist 122 and the metering device 108.

The example media detector 206 of FIG. 2 includes one or more sensors 207, such as, for instance an optical and/or audio sensor configured to detect particular aspects of media to which the metering device 108 is exposed. For example, the media detector 206 may be capable of collecting signatures and/or detecting codes (e.g., watermarks) associated with media content to which it is exposed from audio signals emitted by an information presentation device. Data gathered by the media detector 206 is stored in the memory 208 and later used (e.g., at the central facility) to identify the media to which the metering device 108 is being exposed. The precise methods to collect media identifying information are irrelevant, as any methodology to collect audience measurement data may be employed without departing from the scope or spirit of this disclosure.

The example packaging sensor(s) 210 of FIG. 2 collect information to enable the determination of whether the metering device 108 is within a package 125 (i.e., to determine "packaging status"). For instance, in some examples described in detail below, the packaging sensor(s) 210 detect the presence of a physical stimulus, an electronic signal and/or a field associated with the package 125.

In the illustrated example, the packaging sensor(s) 210 are periodically or non-periodically activated to take a desired reading. For example, the packaging sensor(s) 210 may actively collect data at 30 minute intervals. The period of time between readings may be different for different applications. Additionally or alternatively, the sensor(s) 210 may passively (e.g., continuously) detect the presence of the stimulus (e.g., in the case of the sensor being implemented by an on/off switch and the structure being a projection that physically forces the switch into an off state).

The data from the packaging sensor(s) 210 is conveyed to the packaging detector 212 which recognizes the detected stimulus and/or the state of the sensor(s) to determine whether the metering device 108 is within the package 125. In the case of an on/off switch that is forced to the off state, the detector 212 can be eliminated because the switch (which may be located to break a power supply current) effectively serves this function. Example implementations of the determination process are described in further detail below.

When the packaging detector 212 determines that the metering device 108 is housed within a package 125, the packaging detector 212 causes the metering device 108 to power off and/or continues to hold the device in the powered off state. Again, in the example where the on/off switch serves the detector function, the detector 212 may be omitted. While in some instances, the power off command may completely shut down power to all elements of the metering device 108, in this example, a power off command includes a powering down of all elements except for the example real-time clock 214 and the memory 208. In other words, when the metering device 108 is powered down, an electrical connection is maintained between the memory 208, and the battery 216 to enable the storage of information in the memory 208. This connection may be maintained in the on/off switch example via a separate connection not including the switch.

If the example packaging detector 212 determines that the metering device 108 is not located within a package 125, the metering device 108 may be powered on if necessary. For instance, when the metering device 108 is received by the panelist 122 and removed from the package 125, the packaging detector 210 may determine that the metering device 108 is not within a package 125 and may power on the metering device, and prepare the metering device 108 for recording data. In other examples, the metering device 108 is powered on at a predetermined time (i.e., a "wake-up" time) stored in the real-time clock 214 and/or stored in the memory 208 and based on a comparison to the time of the real-time clock 214. In still other examples, the metering device 108 may be continuously on unless the on/off switch 215 is actuated to off by a detected environmental factor (e.g., a low light level). Still further, the metering device 108 may include a switch 215A that may be depressed, moved, or otherwise activated by the panelist 122 or other user to power on the device 108. The inclusion of the packaging sensor(s) 210 and the packaging detector 212 ensures the device is off when shipped even if the panelist or manufacturer fails to turn off the device by activating the switch 215A prior to shipping.

The elements of the metering device 108 that receive power during either power off or power on modes may be chosen as desired. For example, during the power off mode the battery 216 may supply power to any desired subset of the example communication interface 200, user interface 202, display 204, media detector 206, memory 208, packaging sensor(s) 210, packaging detector 212, real-time clock 216, and/or any other element. However, the subset is preferably selected to comply with applicable shipping regulations.

The packaging sensor(s) 210 of the illustrated example are implemented using, for example, on/off switch(es), audio sensor(s), microphone(s), IR sensor(s), RF sensor(s), optical sensor(s), magnetic sensor(s), and/or any other combination or type of sensor capable of detecting the stimulus to determine whether the metering device is within the package 125. When two or more on/off switches are employed, they may be connected in series such that activation of any one of the switches is sufficient to power off the metering device or connected in parallel so that all switches must be activated to power off the device.

Figure 3A:
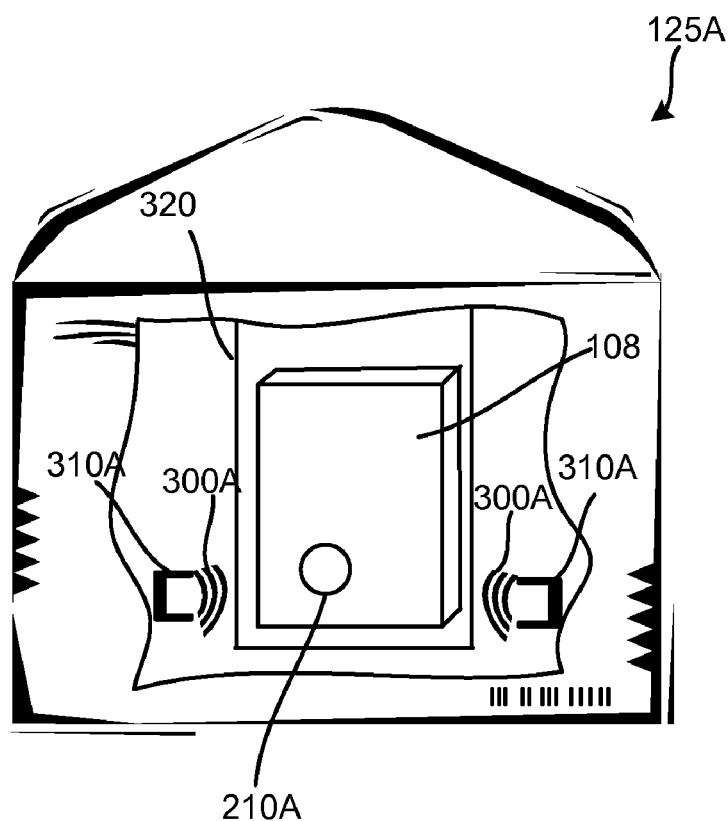
FIGS. 3A-3F illustrate example implementations of the example metering device of FIG. 2 located in an example package.

FIG. 3A illustrates an example implementation of the example metering device 108 of FIG. 2 located within an example package 125A. In the example, the packaging sensor 210 is implemented by a magnetic sensor 210A adapted to detect a magnetic field 300A. The magnetic field 300A may be generated by a magnet 310A located within the package 125A. In the illustrated example, a pair of magnets 310A is located within the package 210 with each magnet 310A located on opposite sides of the package 125A to ensure that the generated magnetic field 300A is detected by the sensor 210A regardless of the orientation of the example metering device 108 within the package 125A. The package 125A may include an internal housing such as, for example, a slot 320 or other suitable partition and/or container defined by the package 125A and sized to hold the metering device 108 when inserted into the package 125A. In this example, the slot 320 is adapted to hold the metering device 108 in close proximity to at least one of the magnets 310A. The package 125A may be constructed of paper, cardboard, plastic, and/or any other suitable packaging material. In some examples, the package 125A includes magnetic shielding (not shown) to prevent the magnetic field 300A from traveling outside of the package 125A. Such shielding prevents false triggering of the device when, for example, the metering device is located near, but outside, the package 125A.

When the metering device 108 is inserted into the package 125A, the magnetic field 300A is detected by the magnetic sensor 210A. In other words, when the metering device 108 is inserted into the package 125A and brought into close proximity to at least one of the magnets 310A, at least one of the stimuli (i.e., the magnetic fields 300A) generated by the magnets 310A is detected by the magnetic sensor 210A. Because the example package 125A includes a pair of magnets 300A located on either side of the slot 320, and generating magnetic fields 300A in close proximity to the respective magnets 310A the orientation of the metering device 108 within the slot 320 and thus the orientation of the magnetic sensor 210A is irrelevant, as the magnetic sensor 210A will detect at least one magnetic field 300A in any orientation. In the illustrated example, the slot 320 and the metering device 108 are rectangular so that only two (top to bottom) orientations of the device 108 within the slot 320 are possible.

Figure 3B:
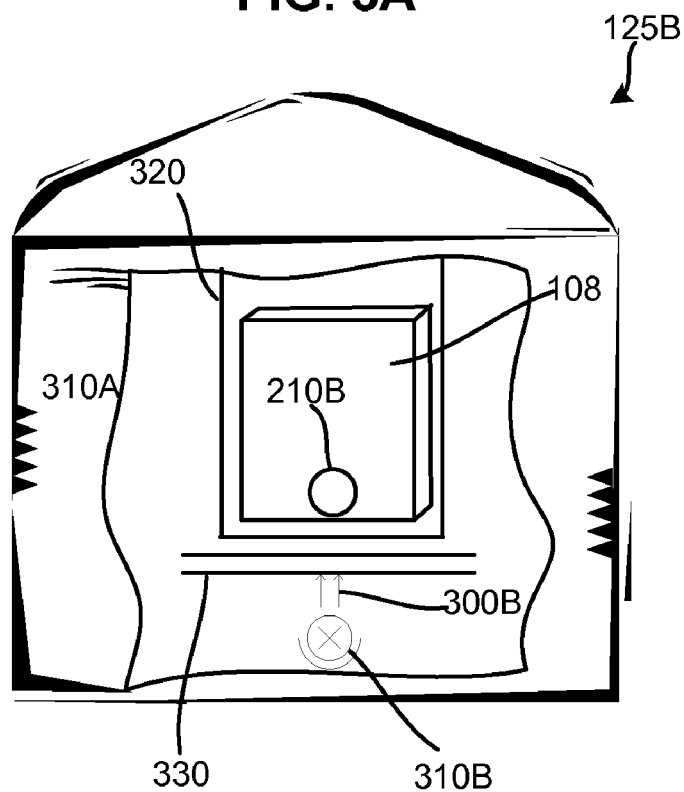

FIG. 3B illustrates another example implementation of the example metering device 108 of FIG. 2 located within an example package 125B. In the illustrated example of FIG. 3B, the packaging sensor 210 is implemented by a receiver, such as, for example, an infrared (IR) receiver 210B. The IR receiver 210B is capable of detecting an infrared stimulus, such as, for example, an infrared signal 300B generated by an infrared transmitter 310B. The illustrated example package 125B includes an IR transmitter 310B located within the package 125B and adapted to generate an infrared signal that is detectable by the IR receiver 210B. In other examples, the IR transmitter 310B may be a transmitter adapted to broadcast a signal other than infrared, such as, for instance, a radio-frequency (RF) transmitter capable of transmitting an RF signal, while the IR receiver 210B may be adapted to detect the transmitted signal accordingly. The IR transmittal 310B may be self-powered (i.e. contain its own power source such as, for example, a battery or induction device), and/or may receive power by being operatively connectable to the metering device 108.

The example package 125B may include an internal housing such as, for example, a slot 320 defined by the package 125B and sized to hold the metering device 108 when inserted into the package 125B in a desired orientation. In the illustrated example, the slot 320 and the metering device 108 are rectangular so that only two (top to bottom) orientations of the device 108 within the slot 320 are possible. In this example, because an infrared signal generally requires line-of-sight communication between the IR transmitter 310B and the IR receiver 210B, the slot 320 includes a generally transparent surface 330 to ensure that the IR signal will be received and detected by the IR receiver 210B. In some examples, the package 125B includes radio and/or infrared shielding (not shown) to prevent the generated signal 300B from traveling outside of the package 125B. Such shielding prevents false triggering of the device when, for example, the metering device is located near, but outside, the package 125B.

When the metering device 108 is inserted into the package 125B, the IR signal 300B is detected by the IR receiver 210B. In other words, when the metering device 108 is inserted into the package 125B and brought into proximity to the IR transmitter 310B, the stimulus (i.e., the IR signal 300B) generated by the IR transmitter 310B is detected by the IR receiver 210B. The IR transmitter 310B may be activated periodically to generate the signal 300B and/or may be activated a periodically as desired. When activated, the IR transmitter 310B generates an IR signal 300B (e.g., a series of infrared light pulses) which is detectable by the IR receiver 210B. The metering device 108 enters a powered down state when the IR signal is detected.

Figure 3C:
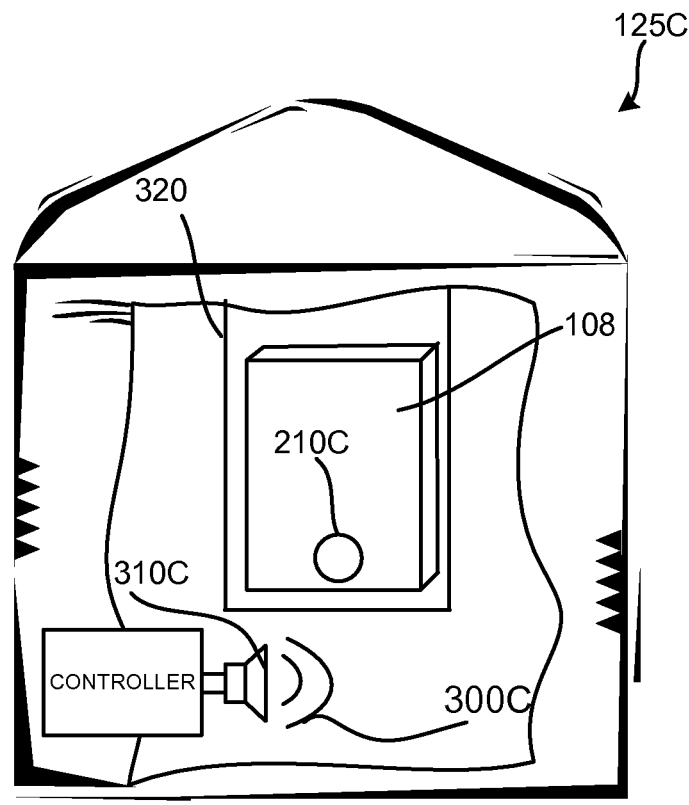

FIG. 3C illustrates yet another example implementation of the example metering device 108 of FIG. 2 located within an example package 125C. In the illustrated example of FIG. 3C, the packaging sensor is implemented by an audio sensor 210C, such as, for example, a microphone. The audio sensor 210C is capable of detecting an audio stimulus, such as, for example, an audio signal 300C generated by a speaker 310C located within the package 125C. In this example, the audio signal 300C may be an audio in the human audible range and/or in the ultrasonic range. The speaker 310C is capable of generating an audio "chirp' pattern detectable by the audio sensor 210C and identifiable by the packaging detector 212 as an "in the package" signal. The speaker 310C may be self-powered (i.e. contain its own power source such as, for example, a battery or induction device), and/or may receive power by being operatively connectable to the metering device 108. In this example, the speaker 310C may be driven by a controller, such as, for example, an analog circuit connected to the real-time clock 214.

As with the previously described example, the example package 125C may include an internal housing such as, for example, a slot 320C defined by the package 125C and sized to hold the metering device 108 in a desired orientation when inserted into the package 125C. In the illustrated example, the slot 320 and the metering device 108 are rectangular so that only two (top to bottom) orientations of the device 108 within the slot 320 are possible. In some examples, the package 125C includes audio insulation or shielding (not shown) to substantially prevent the generated audio signal 300c from being detected outside of the package 125C. Such shielding prevents false triggering of the device when, for example, the metering device is located near, but outside, the package 125C, and thus from falsely triggering a power down of the metering device 108 when the meter is near, but not in, the package.

When the metering device 108 is inserted into the package 125C and the speaker 31C outputs the audio signal 300C, the audio signal 300C is detected by the audio sensor 210C. The speaker 310C may be activated periodically to generate the audio signal 300C and/or may be activated as desired. When activated, the speaker 310C generates an audio signal 300C that correspond to a decodable "in the package" command which is detectable by the audio sensor 210C.

Figure 3D:
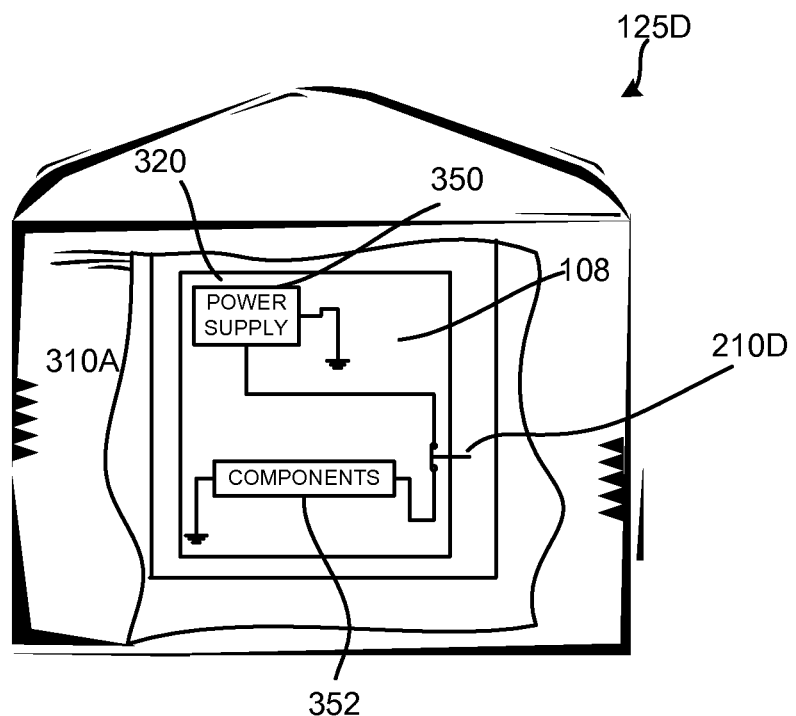
Figure 3E:
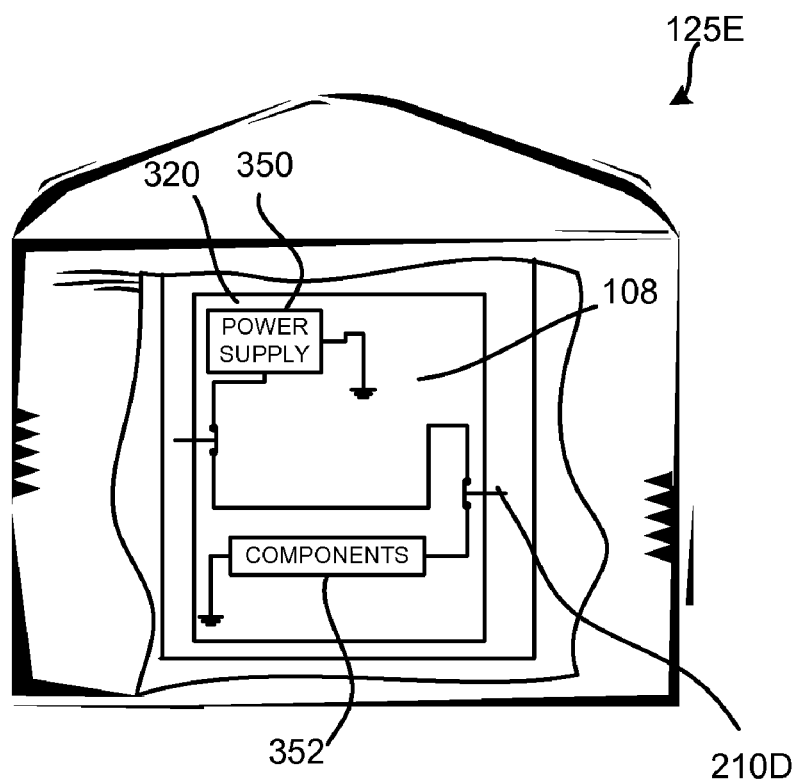
Figure 3F:
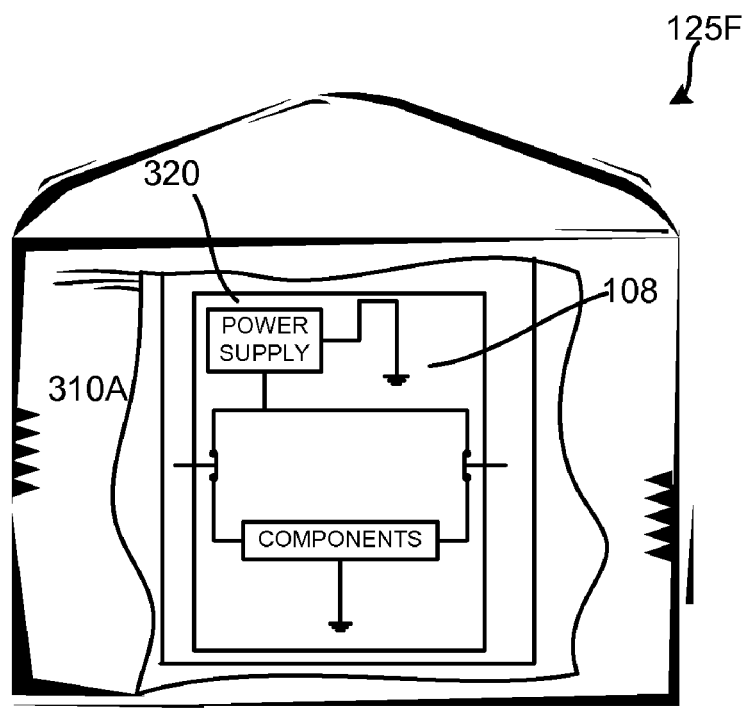

FIGS. 3D-3F illustrate still other example implementations of the example metering device 108 of FIG. 2 located within an example package 125D. In the illustrated examples of FIGS. 3D-3F, the packaging sensor 210 is implemented by at least one switch 210D, such as, for example, a contact switch, a pressure switch, a proximity switch, and/or any switch capable of detecting a physical stimulus. The example package 125D, meanwhile, includes at least one physical actuator 310D, such as, for example, a detent, pin, and/or other device, capable of physically contacting and changing the state of the switch 210D. The actuator(s) 310D may be any type of actuator, or may be specifically formed to matingly engage the switch(es) 210D and to prevent possible false responses by contact with something other than the activator(s) 310D. The example package 125D may also include an internal housing such as, for example, a slot 320D defined by the package 125D and sized to hold the metering device 108 when inserted into the package 125D in an orientation that ensures the switch(es) 210D will engage the actuator. In each of these examples, the slot 320D is adapted to guide the metering device 108 into physical contact with at least one of the physical actuators 310D.

In particular, in each example, when the metering device 108 is inserted into the package 125D, the switch(es) 210D is brought into physical contact with at least one of the actuators 310D. When the metering device 108 is inserted into the package 125D and brought into contact with at least one of the actuators 310D, the actuator 310D changes the state of at least one of the switch(es) 210D (e.g., from "closed" to "open" or vise versa). The example package 125D may include a number of actuators 310D located at different portions of the slot 320 and/or the package 125D and the metering device 108 may include any number of switch(es) 210D to ensure contact between at least one of the actuators 310D and at least one of the switch(es) 210D irrespective of the orientation of the device 108 within the package 125D.

The switch(es) 210D of the illustrated examples in FIGS. 3D-3F are capable of detecting the stimulus to determine whether the metering device is within the package 125. In the example of FIG. 3D, a single switch is connected to a power supply 350 (e.g., the battery 216) such that activation of the switch 210D sufficient to power off the components 352 (e.g., the communication interface 200, the user interface 202, the display 204, the media detector 206, etc.) of the metering device 108. When two or more on/off switches are employed, such as the examples illustrated in FIGS. 3E and 3F, the switches 210D may be connected in series (FIG. 3E) such that activation of any one of the switches 210D is sufficient to power off the metering device 108, or connected in parallel (FIG. 3F) so that all switches 210D must be activated to power off the metering device 108.

As described above in connection with FIG. 2, the packaging sensor(s) 210 (e.g., the magnetic sensor 210A, the IR receiver 210B, the audio sensor 210C and/or the switch 210D) detect the presence of a stimulus, generate a signal indicating a stimulus has been detected, and conveys the signal to the packaging detector 212 (if present). In examples that employ a packaging detector 212, the packaging detector 212 compares the received signal to a criterion or expected value, such as, for example, a threshold or other value to determine whether the metering device 108 is within the package 125. In simplified examples, no comparison is performed and any signal detected by the sensor(s) causes a power down event. In examples employing a mechanical actuator of a switch by a portion of the package, the change in state of the switch may cut the power without any further processing. As described above, if the packaging detector 212 (where employed) determines that the metering device 108 is within the package 125, the metering device 108 will be powered down.

Figure 4A:
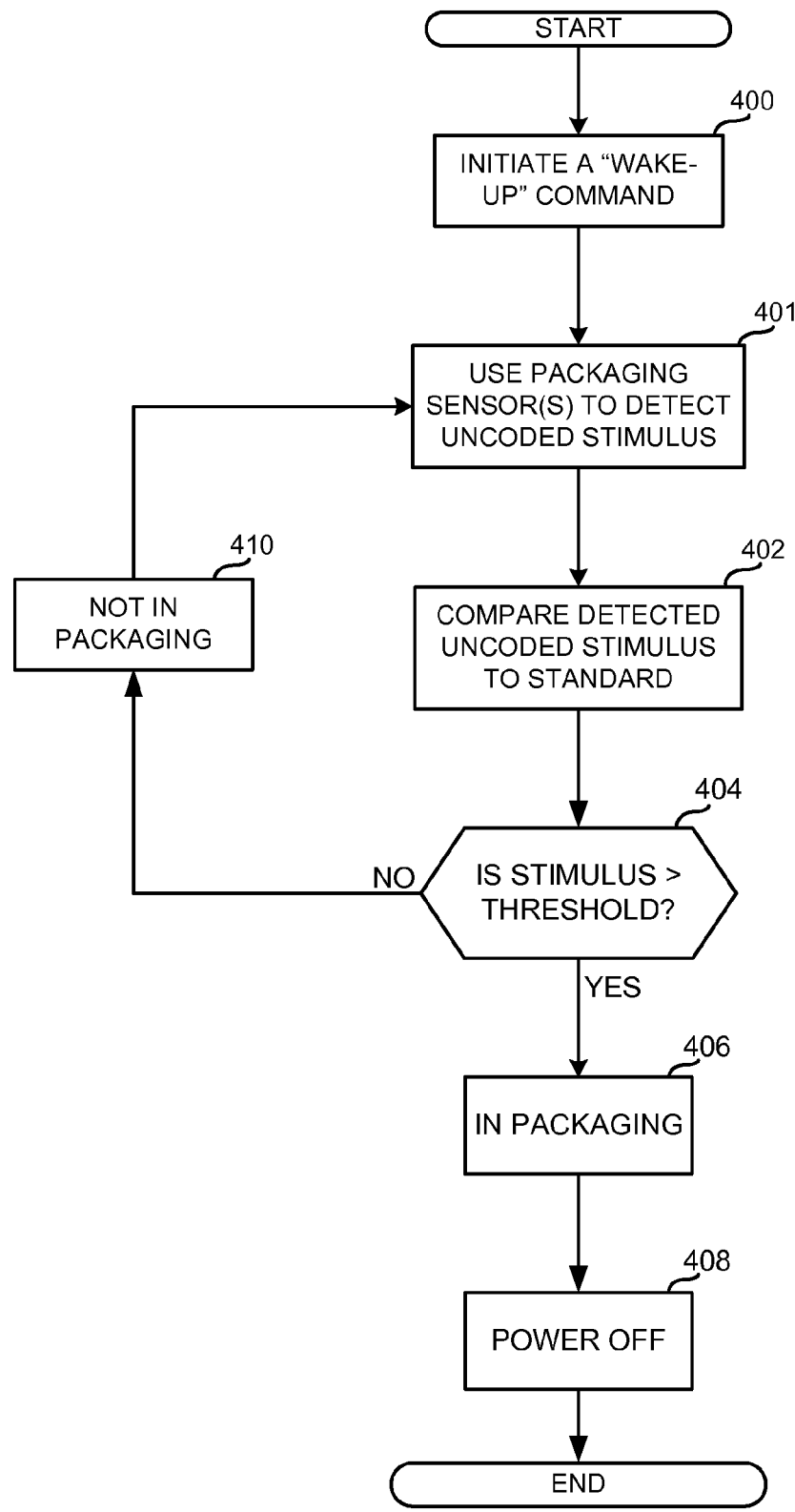
FIGS. 4A-4C are flow diagrams representative of example machine readable instructions that may be executed to implement the example metering devices of FIG. 2 and FIGS. 3A-3F, to collect media exposure information, and to determine whether the metering device is located within a package.
Figure 4B:
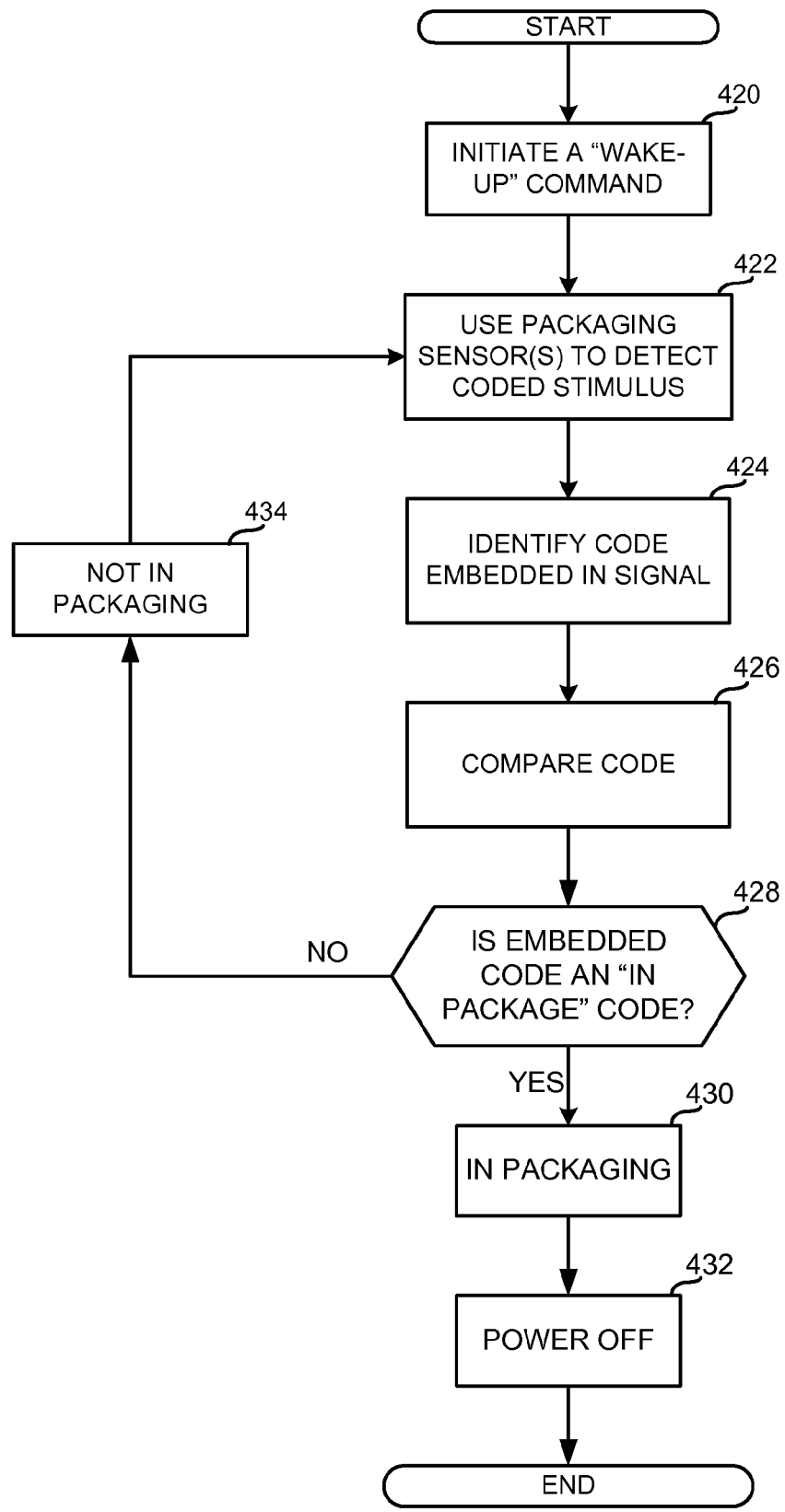
Figure 4C:
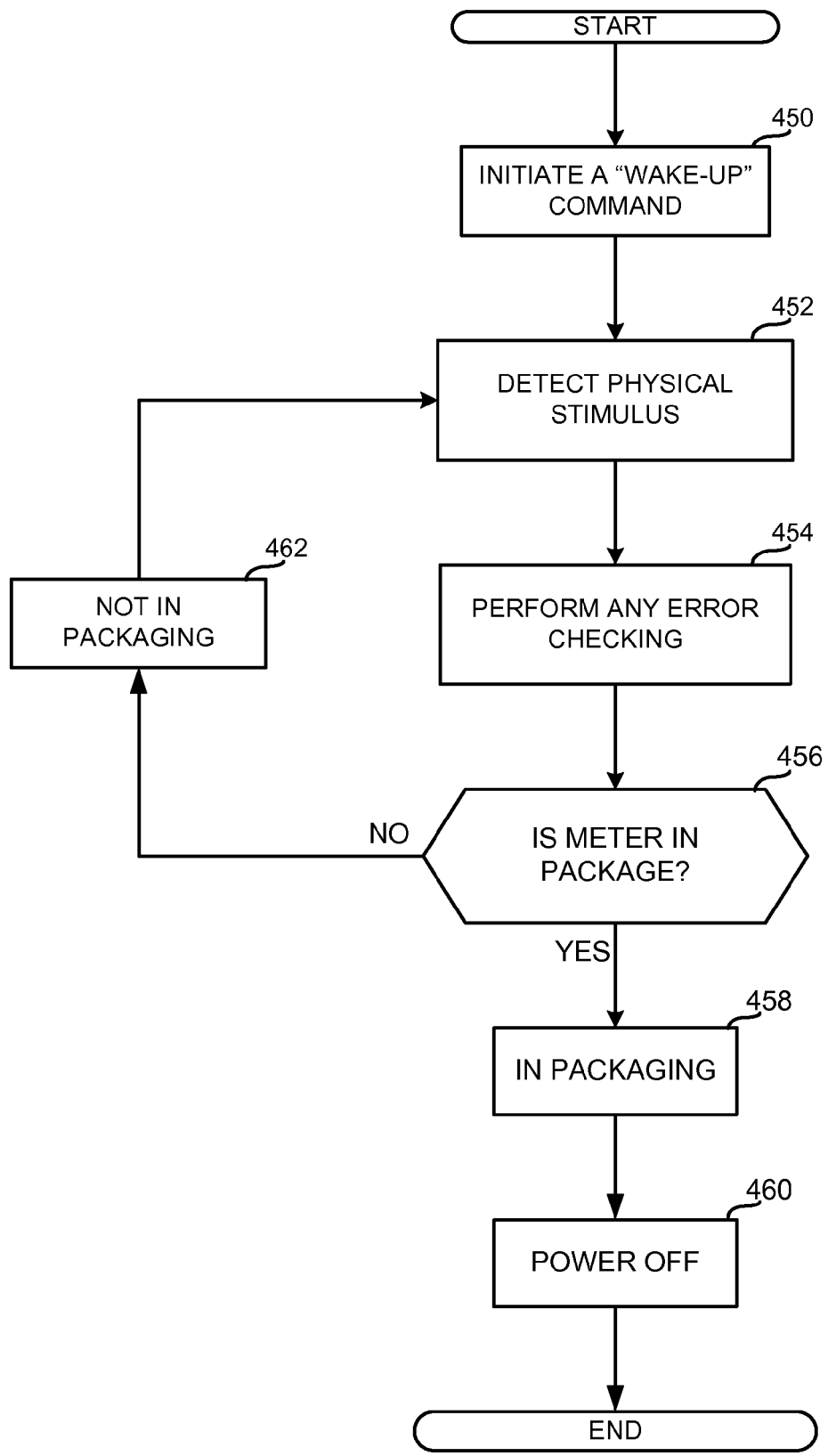

The flow diagrams of FIGS. 4A-4C are representative of machine readable instructions that can be executed on a particular machine to implement the example methods, apparatus, systems, and/or articles of manufacture described herein. In particular, FIGS. 4A-4c depict flow diagrams representative of machine readable instructions that may be executed to implement the example metering device 108 of FIGS. 1, 2, and/or 3A-3D to detect a stimulus, to determine whether the metering device 108 is in the package 125, and to power off the metering device 108 when it is determined that the device is packaged. The example instructions of FIGS. 4A-4C may be performed using a processor, a controller and/or any other suitable processing device. For example, the example instructions of FIGS. 4A-4C may be implemented in coded instructions stored on a tangible medium such as a flash memory, a read-only memory (ROM) and/or random-access memory (RAM) associated with a processor (e.g., the example processor 512 discussed below in connection with FIG. 5). Alternatively, some or all of the example instructions of FIGS. 4A-4C may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example instructions of FIG. 4 may be implemented manually or as any combination(s) of any of the foregoing techniques, for example, any combination of firmware, software, discrete logic and/or hardware. Further, although the example instructions of FIGS. 4A-4C are described with reference to the flow diagram of FIGS. 4A-4C, other methods of implementing the instructions of FIGS. 4A-4C may be employed. For example, the order of execution of the blocks may be changed, and/or some of the blocks described may be changed, eliminated, sub-divided, or combined. Additionally, any or all of the example instructions of FIGS. 4A-4C may be performed sequentially and/or in parallel by, for example, separate processing threads, processors, devices, discrete logic, circuits, etc.

In the examples of FIGS. 4A-4C, the methodology for collecting the media exposure data is not shown. However, it will be understood that media exposure data is being substantially constantly collected (if available) and time stamped when the device is powered on. Thus, the exposure data may be collected in parallel with the execution of the instructions of FIGS. 4A-4C. Thus, for example, the media exposure data may be collected using any desired technique by a parallel thread or the like.

Turning to FIG. 4A, the metering device 108 initiates a "wake-up" command to power on the device 108 if necessary (block 400). For example, the metering device 108 may be powered on at a predetermined time (i.e., a "wake-up" time) stored in the real-time clock 214 or stored in the memory 208 and based on a comparison of the predetermined time to the time of the real-time clock 214. The "wake-up" command may be initialized substantially instantaneously upon activation of the device 108 (e.g., upon completion of manufacturing) and therefore, the device 108 may be considered always awake (e.g. powered down by the switch 215A during shipping). Once powered on, the packaging sensor 210 collects an input reflecting the detection of one or more stimulus (e.g., a magnetic field, an IR signal, an RF signal, an audio signal and/or a physical stimulus) (block 401). In the illustrated examples, the stimulus is actively and/or passively received by the packaging sensor(s) 210 (e.g., the magnetic sensor 21A, the IR receiver 210B, the audio sensor 21C, and/or the switch 210D). The characteristics of the received stimulus may be used to determine the location of the metering device 108 relative to the package 125 and/or the perception of any stimulus may always be considered a determination that the metering device should be powered down.

In particular, the detected uncoded stimulus is compared to a stored value or pattern, such as a threshold, to determine whether the metering device 108 is located within the package 125 (block 402). As noted above, the stored value, threshold, may be determined by any suitable method, including, for instance, previous sampling, statistical analysis of multiple samples, previous readings, information stored in the memory 208, and/or any other determination/storage method. For example, if the detected stimulus is an uncoded signal (e.g., a magnetic field, an IR signal, an RF signal, a sound, etc.), the packaging detectors(s) 212 compares the signal from the sensor 210 to a threshold (block 404). If the detected signal is greater than the threshold (e.g., magnetic field strength, IR signal strength, RF signal strength, audio volume, etc.) (block 404), the packaging detector(s) 212 determine that the metering device 108 is located within the packaging 125 (block 406).

If the packaging detector(s) 212 determine that the metering device 108 is located within the package 125, the packaging detector(s) 212 initiate a powering off of the metering device 108 (block 408). As described above, while in some instances, the power off mode may completely shut down power to all elements of the metering device 108, in this example, a power off mode includes a powering down of all elements except for the example real-time clock 214 and the memory 208 to facilitate periodic testing of the packaging status.

If however, the detected signal is not greater than the threshold (e.g., magnetic field strength, IR signal strength, RF signal strength, audio volume, etc.) (block 404), the packaging detector(s) 212 determine that the metering device 108 is not located within the packaging 125 (block 410). Process control returns to block 401, to await the detection of the next stimulus (block 401).

In other examples, such as the example illustrated in FIG. 4B, the packaging detector(s) 212 identify a coded signal embedded within the received signal. In particular, referring to FIG. 4B, the metering device 108 initiates a "wake-up" command to power on the device 108 if necessary (block 420). Once powered on, the packaging sensor 210 collects an input reflecting the detection of one or more coded stimulus (e.g., a coded, IR signal, RF signal, audio signal, etc.) (block 422). The packaging detector(s) 212 identify the code embedded within the received signal (block 424) and compare the identified code to a known code indicative of an "in package" condition (block 426). If the decoded signal matches the "in package" code (e.g., a code stored in the memory 208) (block 428), the packaging detector(s) 212 determine that the metering device 108 is located within the packaging 125 (block 430).

If the packaging detector(s) 212 determine that the metering device 108 is located within the package 125, the packaging detector(s) 212 initiate a powering off of the metering device 108 (block 432). If however, the decoded signal does not match an "in package" code, (block 430), the packaging detector(s) 212 determine that the metering device 108 is not located within the packaging 125 (block 434). Process control then returns to block 422, to await the detection of the next stimulus (block 422).

In still other examples, such as the example illustrated in FIG. 4C, the metering device 108 detects a physical stimulus to determine whether the metering device 108 is within a package. For example, as illustrated in FIG. 4C, the metering device 108 initiates a "wake-up" command to power on the device 108 if necessary (block 450). Once powered on, the packaging sensor(s) 210 detect a physical stimulus, such as, for example, physical contact between the packaging sensor(s) 210 and the package 125 (block 452). As noted above, the packaging sensor(s) 210 may be at least one switch, and when two or more on/off switches are employed, they may be connected in series such that activation of any one of the switches is sufficient to power off the metering device or connected in parallel so that all switches must be activated to power off the device. Additionally, when employed, the packaging detector(s) 212 may perform an error check (e.g., a check for false positive) as desired (block 454). For example, the packaging detector(s) 212 may initiate a timer to ensure that the packaging sensor(s) 210 switch was not just accidentally bumped. Other error checks may be provided as well.

Once the packaging sensor(s) 210 is activated, and any error check is performed, a positive determination (block 456) that the metering device 108 is located within the package 125 (block 458), results in an initiation of a powering off of the metering device 108 (block 460). Otherwise, the metering device 108 is not located within the packaging 125 (block 462) and process control then returns to block 452, to await the detection of the next stimulus (block 452).

Figure 5:
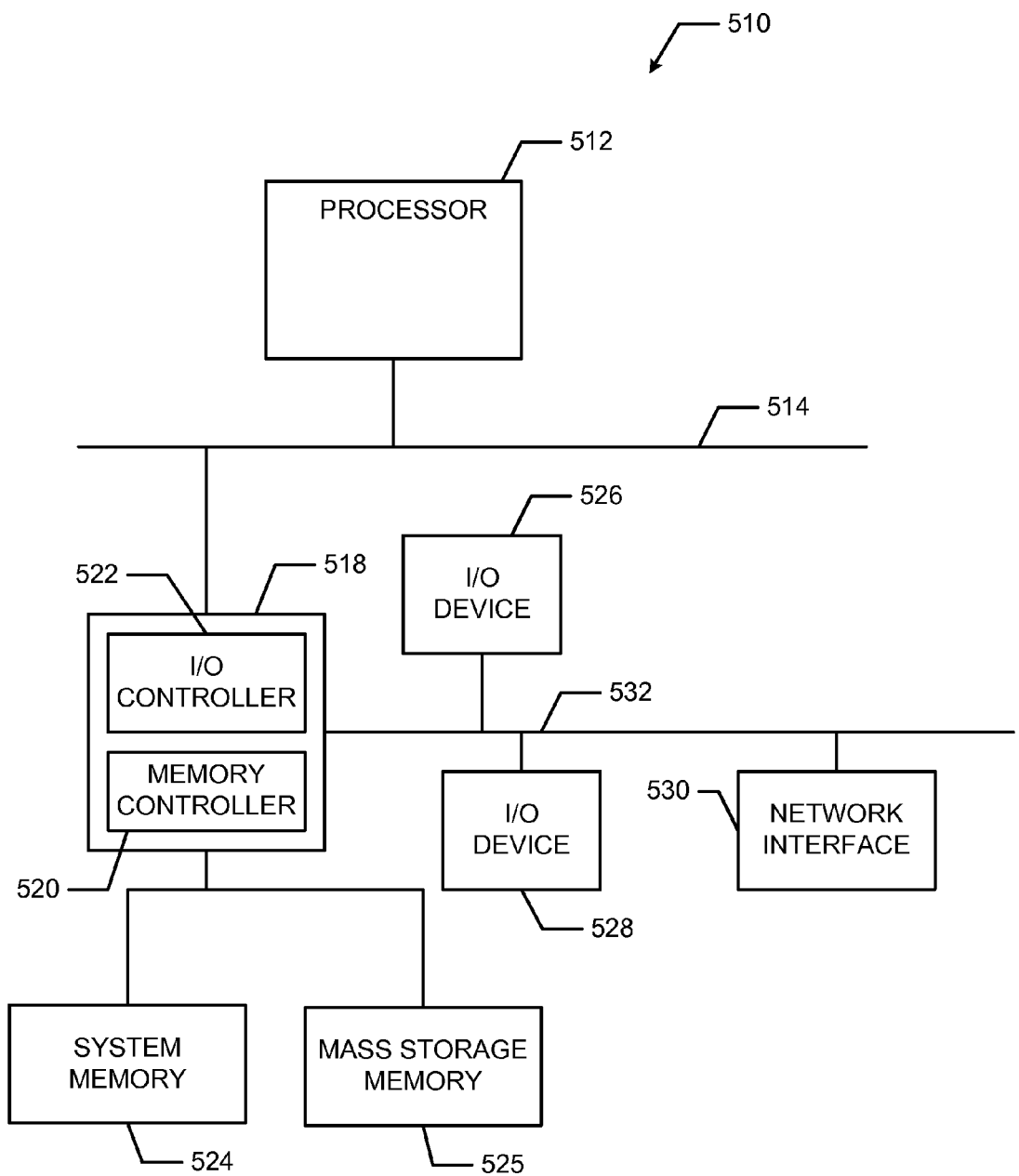
FIG. 5 is a block diagram of an example processor system that may be used to execute the machine readable instructions of FIG. 4 to implement the example metering device of FIG. 2.

FIG. 5 is a block diagram of an example processor system 510 that may be used to execute the instructions of FIG. 4 to implement the example metering device 108 of FIG. 2. As shown in FIG. 5, the processor system 510 includes a processor 512 that is coupled to an interconnection bus 514. The processor 512 may be any suitable processor, processing unit or microprocessor. Although not shown in FIG. 5, the system 510 may be a multi-processor system and, thus, may include one or more additional processors that are different, identical or similar to the processor 512 and that are communicatively coupled to the interconnection bus 514.

The processor 512 of FIG. 5 is coupled to a chipset 518, which includes a memory controller 520 and an input/output (I/O) controller 522. The chipset 518 provides I/O and memory management functions as well as a plurality of general purpose and/or special purpose registers, timers, etc. that are accessible or used by one or more processors coupled to the chipset 518. The memory controller 520 performs functions that enable the processor 512 (or processors if there are multiple processors) to access a system memory 524 and a mass storage memory 525.

The system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system.

While the memory controller 520 and the I/O controller 522 are depicted in FIG. 5 as separate blocks within the chipset 518, the functions performed by these blocks may be integrated within a single semiconductor circuit or may be implemented using two or more separate integrated circuits.

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. An audience measurement device, comprising:
   a housing;
   a media detector in the housing to collect media exposure data;
   a packaging sensor to receive a physical stimulus provided by an actuator located within a package; and
   a packaging detector to respond to the physical stimulus by powering down a first component of the audience measurement device and maintaining power to a second component of the audience measurement device.

2. A device as defined in claim 1, wherein the second component is to facilitate testing via the packaging sensor while the first component is powered down to determine whether the device is located within the package.

3. A device as defined in claim 2, wherein testing includes determining whether the packaging sensor detects the physical stimulus.

4. A device as defined in claim 1, further comprising a memory to store the collected media exposure data.

5. A device as defined in claim 1, wherein the package is a mailer.

6. A device as defined in claim 1, wherein the media exposure data comprises at least one of a signature or an identification code to which the device is exposed.

7. A device as defined in claim 1, further comprising a real-time clock.

8. A device as defined in claim 7, further comprising a user interface to communicate information to a user, and wherein the user interface is to display a message to the user based upon the real-time clock.

9. A device as defined in claim 1, wherein the physical stimulus comprises contact between the actuator and the packaging sensor.

10. A device as defined in claim 1, wherein the device is to be inserted into an internal housing of the package configured to guide the packaging sensor into contact with the actuator when the device is inserted into the internal housing.

11. A device as defined in claim 1, wherein the packaging sensor is formed to matingly engage the actuator.

12. An audience measurement device, comprising:
    a housing;
    a media detector in the housing to collect media exposure data;
    a packaging sensor to receive a physical stimulus provided by an actuator located within a package; and
    a packaging detector to issue a command to cause the device to power down a first component of the device and maintain power to a second component of the device in response to the packaging sensor being engaged by the actuator.

13. A device as defined in claim 12, further comprising a memory to store the collected media exposure data.

14. A device as defined in claim 12, wherein the second component is to facilitate testing via the packaging sensor while the first component is powered down to determine whether the device is located within the package.

15. A device as defined in claim 12, further comprising a user interface to communicate information to a user based on a real-time clock.

16. A device as defined in claim 12, wherein the device is to be inserted into an internal housing of the package configured to guide the packing sensor into contact with the actuator when the device is inserted into the internal housing.

17. A device as defined in claim 12, wherein the sensor comprises a switch coupled to a power supply of the device.

18. A method of enforcing a power down state in an audience measurement device during shipping of the device, comprising:
    determining whether a sensor of the audience measurement device is mechanically engaged by an actuator of a shipping container;
    determining whether the device is located within the shipping container based on a reading of the sensor; and
    powering off a first portion of the audience measurement device when the sensor is mechanically engaged by the actuator; and
    maintaining power to a second portion of the audience measurement device when the sensor is mechanically engaged by the actuator.

19. A method as defined in claim 18, wherein the actuator comprises a projection within the shipping container.

20. A method as defined in claim 18, further comprising powering on the audience measurement device when the device is not located within the shipping container.

21. A method as defined in claim 18, wherein the second portion of the audience measurement device is to facilitate a periodic test to determine whether the device is located within the shipping container.

22. A method as defined in claim 18, further comprising collecting media exposure data with the audience measurement device.

23. A method as defined in claim 18, wherein the shipping container comprises an internal housing to orient the audience measurement device such that the sensor engages the actuator when the audience measurement device is inserted into the internal housing.

24. A tangible machine readable storage medium comprising instructions that, when executed by a processor, cause a machine to at least:

determine whether a sensor of an audience measurement device is mechanically engaged by an actuator of a shipping container;

determine whether the device is located within the shipping container based on a reading of the sensor; and power off a first portion of the audience measurement device when the sensor is mechanically engaged by the actuator; and maintain power to a second portion of the audience measurement device when the sensor is mechanically engaged by the actuator.

25. A tangible machine readable medium as defined in claim 24, wherein the shipping container comprises an internal housing to orient the audience measurement device such that the sensor engages the actuator when the audience measurement device is inserted into the internal housing.

* * * * *